Dec. 6, 1938.  J. W. HOWIE  2,139,499
SOLDERING AND WELDING TOOL
Filed Oct. 9, 1936  2 Sheets-Sheet 1
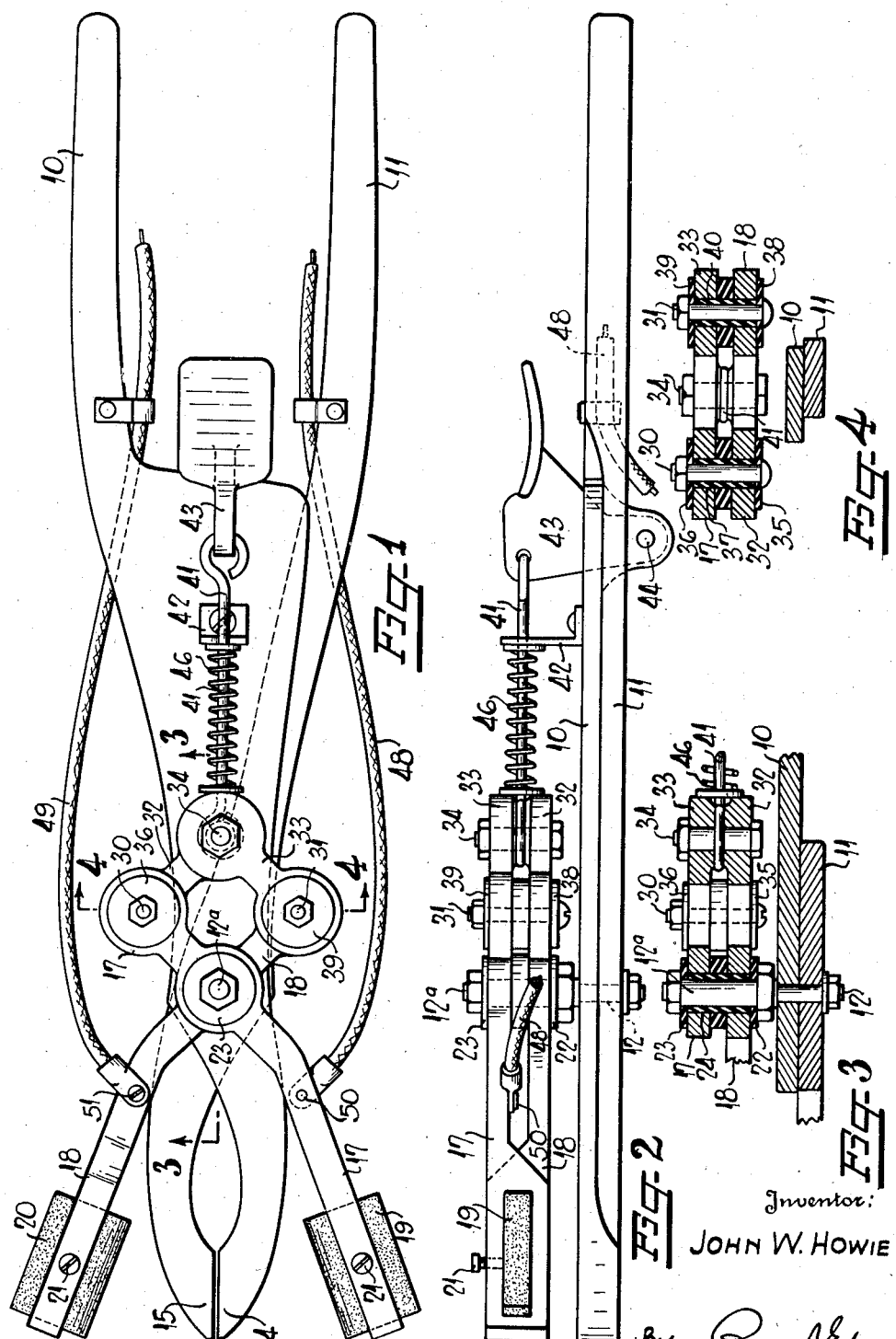
Inventor:
JOHN W. HOWIE
By Paul Eaton
Attorney Dec. 6, 1938.  J. W. HOWIE  2,139,499
SOLDERING AND WELDING TOOL
Filed Oct. 9, 1936  2 Sheets-Sheet 2
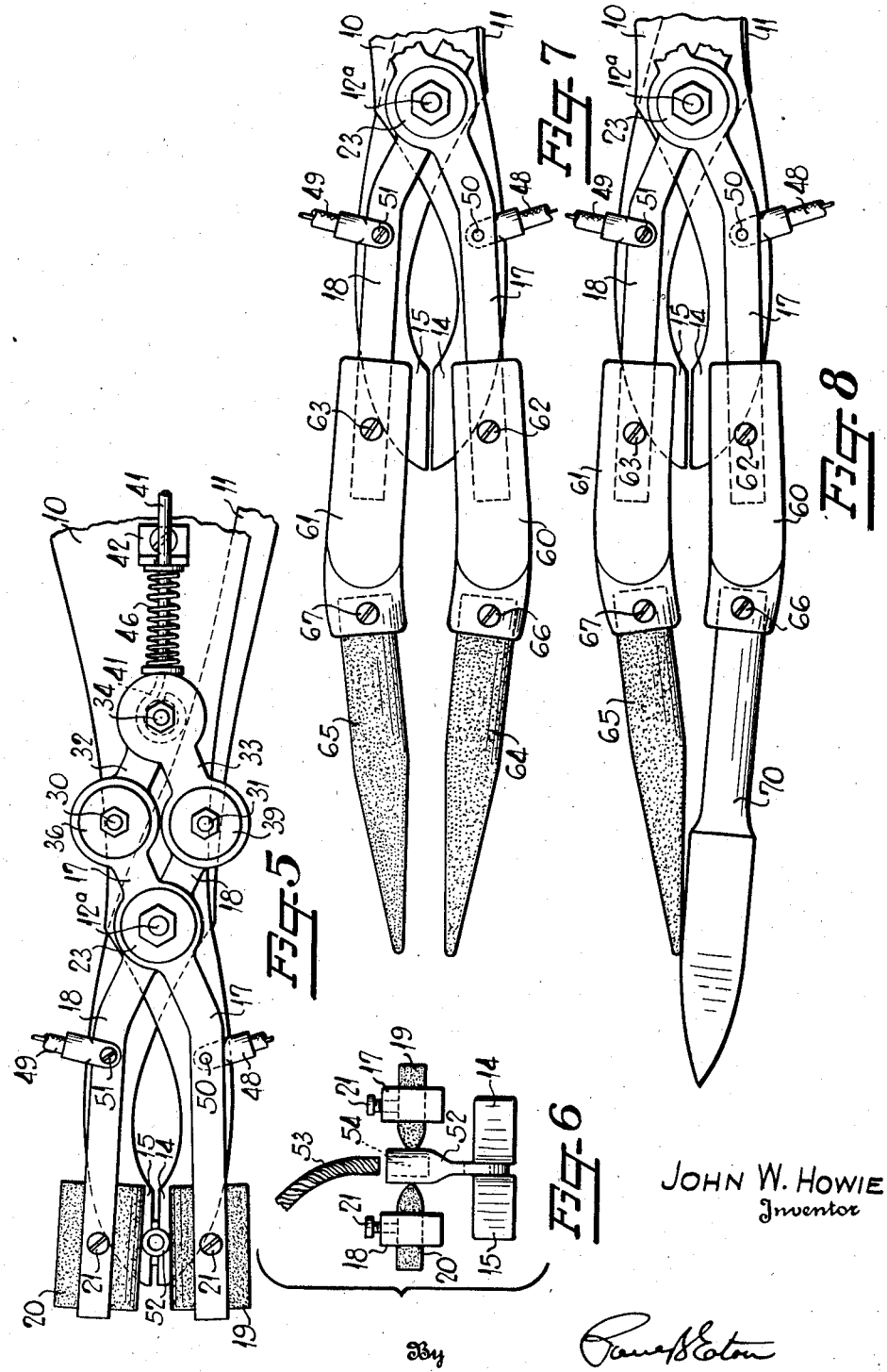
John W. Howie
Inventor Patented Dec. 6, 1938

2,139,499

UNITED STATES PATENT OFFICE 2,139,499

SOLDERING AND WELDING TOOL

John W. Howie, near Charlotte, N. C., assignor of forty per cent to James J. Pierce, Charlotte, N. C.

Application October 9, 1936, Serial No. 104,867

7 Claims. (Cl. 219—12)

This invention relates to an electric welding and soldering apparatus and more especially to an apparatus which can be used to clamp the work piece and weld or solder the same while the same is being held.

It frequently occurs in welding, soldering, brazing and the like, that it is necessary for two employees to be employed for performing this operation, since one person has to hold the work piece in its proper position while the other is using the welding or soldering apparatus. In the construction of an electric welding apparatus, difficulties have been encountered because of the lack of a convenient arrangement of controlling the distance of the arc from the work and at the same time holding the work piece in its proper position relative to the arc.

According to my invention, I employ an electric welding or soldering apparatus comprising two carbon electrodes pivotally attached to the parts of a portable and manually operated clamp, said carbon electrodes being pivotally mounted on the same pivot as the clamping means for holding the work piece. Means are provided whereby the relative distance between the carbon electrodes may be manually regulated independently of the clamping means, thereby enabling the user to use the clamping means and soldering or welding means independently of each other instead of using them jointly.

The invention is also useful in connection with that branch of electric welding known as "spot welding". In this process a pair of electrodes is brought into contact with the opposite sides of a plurality of metal sheets which are desired to be joined together. When a surge of electric current is passed through the electrodes and through the metal, the intensity of the surge will fuse the metal sheets to one another at their point of contact.

It is therefore an object of this invention to provide a combination tool which simultaneously clamps the work-piece at the same time it is being welded or soldered so that the additional help of an extra employee will be eliminated; since one person can perform this operation without any assistance.

It is another object of this invention to provide a welding or heating tool which permits the attachment thereto of a variety of different shaped electrodes in order that the tool may be used for different purposes. By providing a detachable electrode another tool such as a soldering iron may replace one of the electrodes so that the tool may be placed in the circuit, at will, and heated to the desired point for soldering purposes.

Some of the objects of the invention having been stated, other objects will appear as the description proceeds when taken in connection with the accompanying drawings, in which:—

Figure 1 is a plan view of the invention;

Figure 2 is a side elevation of Figure 1;

Figure 3 is a longitudinal sectional view taken along line 3—3 in Figure 1;

Figure 4 is a transverse sectional view taken along line 4—4 in Figure 1;

Figure 5 is a plan view of a portion of the invention, shown in clamped relation to a workpiece;

Figure 6 is an end view looking at the left-hand end of Figure 5;

Figure 7 is a plan view of a portion of the invention with a pair of different shaped electrodes secured thereto;

Figure 8 is a plan view similar to Figure 7 but showing one electrode replaced with a soldering iron, said soldering iron contacting the electrode in order that the soldering iron may be heated by the current which passes therethrough.

Referring more specifically to the drawings, the numerals 10 and 11 denote suitable handles of the clamping device which handles are pivoted to each other by any suitable means such as bolt 12. These handles have jaws 14 and 15 respectively, between which a suitable work piece is adapted to be clamped. The bolt 12 has integral therewith an enlarged portion 12a (see Fig. 3) around which is pivoted electrode holders 17 and 18, the free end of said holders having adjustably mounted therein suitable carbon blocks 19 and 20 by any suitable means such as set screws 21.

It will be noted by referring to Figure 3 that the holders 17 and 18 are insulated from each other and also from portion 12a of bolt 12 by means of insulating washers 22 and 23, and also by an insulating collar 24. The right hand ends of holders 17 and 18 are pivoted by suitable means such as bolts 30 and 31 to links 32 and 33 respectively, said links, in turn, being pivotally connected to each other at their other ends by any suitable means such as bolt 34. Likewise, the holder 17 is insulated from link 32 and bolt 30 by means of insulating washers 35 and 36, and also by means of insulating collar 37, all of which surround the bolt 30. Similarly, the bolt 31, holder 18 and link 33 are insulated from each other by means of washers 38 and 39 and also collar 40, all of which surround bolt 31.

Bolt 34, which pivotally secures links 32 and 33 to each other, has loosely secured therearound the hooked end of wire 41, said wire extending to the right in Figures 1 and 2, and being slidably mounted in an upstanding angle bracket 42. The angle member 42 is secured to the upper portion of handle 10 and forms a guide for the wire 41. This bracket assists trigger 43 in maintaining parts 18 to 34 in their proper position relative to bolt 12 and also in proper alinement with the clamping means.

Lever or trigger 43 has the lower end thereof pivoted as at 44 to the lower side of handle 10. In order to cause the members 17 and 18 to normally assume the position shown in Figure 1 a compression spring 46 has been placed around wire 41 and disposed between the bracket 42 and bolt 34.

It is seen that when trigger 43 is released that spring 46 exerts pressure and as a result the bolt 34, to which members 32 and 33 are pivoted, will be caused to move to the left, thus causing the bolts 30 and 31 to spread apart from each other. This spreading will cause the carbon holders or electrodes 17 and 18 to spread to the position shown in Figure 1. When it is desired to cause the carbon holder to assume the position shown in Figure 5, pressure is applied to the top of trigger 43 thereby rotating this in a clockwise manner. This pressure is usually exerted while the operator is clamping a work piece such as 52 in the proper position. It is evident that the relative distance that the carbons 19 and 20 bear to each other and to the workpiece may be manually controlled by the pressure which is being applied to the trigger.

Holders 17 and 18 have wires 48 and 49 connected thereto as at 50 and 51. The usual electrical welding equipment includes a transformer, not shown, having a comparatively higher voltage, low current primary, and a comparatively low voltage high current secondary. When a suitable work piece 52 is clamped between the carbons 19 and 20, the current is allowed to flow from wire 48 through the holder 17, carbon 19, work piece 52, carbon 20, holder 18 and back through wire 49. In the position shown in Figure 6, the apparatus is used purely as a combination clamp and heating tool for soldering in which only enough resistance is created in order to heat this work piece so that melted solder may be placed in cavity 54 in order to bind a cable 53 therein.

It is evident that a pair of work pieces such as steel plates could be clamped between jaws 14 and 15; and with a sufficient electric surge through these parts a satisfactory spot weld could be effected.

As heretofore stated, the wire 41 in combination with brackets 42 and trigger 43 holds the carbon holders in their proper position relative to the bolt 12. In other words a limited bodily rotation of the combined parts 17 to 34 about bolt 12a is allowed which amount is limited, of course by the amount of lateral flexibility of wire 41. This feature is particularly desirable in many cases for it very frequently happens that the work piece cannot be clamped between the jaws 14 and 15 so that the upper portion thereof will be located exactly in the same relative position to the electrodes. In which case, the carbons 19 and 20 should move over laterally a slight distance in order to take care of this off-set position or irregularity in the work piece at the point of engagement by the electrodes.

Figure 7 shows a slightly modified form of the invention in which the tool is used purely as a welding or heating apparatus. In this form, the carbons 19 and 20 have been removed from the carbon holders 17 and 18 and in their place suitable brackets 60 and 61 have been secured thereto as at 62 and 63. Removably mounted within the ends of brackets 60 and 61 are carbons 64 and 65 which are secured within these members by any suitable means such as set screws 66 and 67. By using an attachment of this type it is evident that the carbons or electrodes may be positioned in close places where the carbon shown in Figures 1 to 5 could not be placed.

The relative position of the carbons 64 and 65 are regulated in this form in a similar manner to that shown in the previous figures, and the operator may vary the arc which is produced by the amount of pressure applied upon trigger 43.

Figure 8 shows a form similar to Figure 7 but in this case, carbon 64 has been removed and a soldering iron 70 has been placed in its stead. The current flows from carbon holder 17 through solding iron 70 and to carbon 65, to heat this soldering iron. After it has been sufficiently heated, pressure upon trigger 43 will be relieved and the carbon 65 will automatically move away from the soldering iron. The combined tool may then be used for soldering purposes. This combination affords an everready heating means for the iron which is conveniently located for furnishing additional heat.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. In a tool for soldering, welding and the like, a pair of clamping members pivotally secured to each other intermediate their ends and crossing each other at their pivot points to provide a pair of handle members on one end and a pair of clamping members for a work piece on their other ends, electrical heating means pivotally mounted on said clamping members and having means engageable by the same hand which is holding said handle members for moving said electrical heating means into contact with a workpiece held by the clamping members.

2. In a soldering and welding tool, a pair of pliers for holding a work piece, a pair of movable electrodes mounted on the pliers, and means engageable by the thumb of the same hand of the operator which is employed for holding the pliers in engagement with a work piece for moving the electrodes into contact with the work piece.

3. In a tool for soldering, welding and the like, a pair of clamping members pivotally secured to each other intermediate their ends and being engageable by the hand of an operator at one end to hold a workpiece between their other ends, a pair of electrodes pivotally mounted intermediate their ends on the same pivot as the clamping members, resilient means normally holding the electrodes a substantial distance from each other, and means engageable by the same hand engaged in holding said clamping members for moving the electrodes towards each other into contact with the work piece held by the clamping members.

4. A tool for soldering, welding and the like comprising means for holding a work piece, electrical heating means mounted on the means for holding the workpiece, and means engageable by the thumb of the hand employed for manipulating the means for holding the workpiece for moving the electrical heating means independently of the means for holding the work piece.

5. A pair of pliers for holding a work piece, electrical heating means for the work piece mounted on the pliers, and means operable by the thumb of the hand employed in holding the pliers to support the work-piece for moving the electrical heating means into contact with the work piece held by the pliers.

6. In a tool for soldering and welding, a pair of pliers having clamping jaws for holding a work-piece, a pair of electrodes mounted on the pliers, resilient means normally moving the electrodes apart from each other, means within reach of the same hand of an operator employed in holding the clamping jaws into contact with a work piece for moving the electrodes into contact with the work piece held by the clamping jaws, whereby one operator can hold the work piece and move the electrodes into contact therewith with one hand, while the other hand of the operator is free to feed soldering or welding materials to the work piece.

7. A soldering and welding tool comprising a pair of pliers, a pair of electrodes mounted intermediate their ends in crossed relation on the pivot point of the pliers and insulated therefrom, a pair of links pivotally secured at one end to the rearmost ends of the electrodes, the other ends of said links being pivotally secured to each other, a member having its forward end secured to the rear ends of said two links, and a handle member secured to the rear end of said member and engageable by the same hand while employed in holding the pliers to move the electrodes into contact with the work piece held by the pliers.

JOHN W. HOWIE.